US006846293B2

(12) United States Patent
Butler et al.

(10) Patent No.: US 6,846,293 B2
(45) Date of Patent: Jan. 25, 2005

(54) SPINAL FLUID COLLECTION SYSTEM

(76) Inventors: Bradley S. Butler, 6412 E. Calle del Paisaro, Scottsdale, AZ (US) 85251; Michael T. Egan, 6289 W. Louise Dr., Glendale, AZ (US) 85310

( * ) Notice: Subject to any disclaimer, the term of this patent is extended or adjusted under 35 U.S.C. 154(b) by 0 days.

(21) Appl. No.: 09/730,334

(22) Filed: Dec. 5, 2000

(65) Prior Publication Data

US 2002/0068882 A1 Jun. 6, 2002

(51) Int. Cl.[7] ..................................... A01B 5/00

(52) U.S. Cl. ..................................... 600/573

(58) Field of Search ..................................... 600/573, 575, 600/576; 433/77, 79; 294/172, 159, 143, 144, 137; 206/557, 139, 201, 203, 561, 562, 563, 564

(56) References Cited

U.S. PATENT DOCUMENTS 4,040,234 A * 8/1977 Stockdale et al. ............ 53/471
4,128,173 A * 12/1978 Lazarus et al. ............ 206/570
4,284,603 A * 8/1981 Korom ............ 422/101
4,411,868 A * 10/1983 Noack ............ 422/104
5,396,899 A * 3/1995 Strittmatter ............ 600/576
5,462,163 A * 10/1995 Berry ............ 206/370
5,632,388 A * 5/1997 Morrison et al. ............ 211/74
5,836,928 A * 11/1998 Gerber et al. ............ 604/317
6,086,827 A * 7/2000 Horner et al. ............ 422/102
6,306,103 B1 * 10/2001 Tyler ............ 600/573

* cited by examiner

*Primary Examiner*—Max F. Hindenburg
*Assistant Examiner*—Pamela L Wingood

(57) ABSTRACT

A cerebrospinal fluid collection system and method for conveniently and safely holding in a test tube rack, during a spinal tap and collection procedure, sterile test tubes and spinal needles, needle sleeves and stylettes. A test tube rack has four holes for holding four sterile test tubes, two needle holes for holding a spinal needle, stylette or needle sleeve, and a handle for the physician to hold when moving the test tube rack during the CSF procedure. The handle can be held on the left side by a left hand, on the right side by a right hand, or in the front by either hand. The test tube rack also allows the physician to see when the appropriate amount of cerebrospinal fluid has been collected in each test tube, while such test tube is being held in the test tube rack. The test tube rack may be prepackaged with the other needed items in a sterile package.

5 Claims, 9 Drawing Sheets

SPINAL FLUID COLLECTION SYSTEM

BACKGROUND

A spinal tap is a procedure which takes samples of a patient's cerebrospinal fluid (CSF). Spinal taps are performed when the physician suspects that the patient may have bleeding (such as subarachnoid hemorrhage) or an infection of the central nervous system (such as meningitis or encephalitis). These procedures are often performed in the emergency room but are also performed in a doctor's office or in a hospital setting.

Usually, before beginning a spinal tap procedure, the physician, or another medical professional arranges the contents of a spinal tap "kit" on a tray, positioned next to where the physician will be sitting to perform the procedure. The "kit" usually consists of four sterile tubes, a spinal needle (with a stylet inserted through the spinal needle), along with items for sterilizing the patient's skin and draping the patient. Sometimes a test tube rack to hold the tubes is also positioned on the tray. Before the procedure, the physician or another medical professional removes all of these items from their sterile packaging, unscrews the caps from the tubes, and arranges everything on the tray for easy access during the procedure.

Usually, the patient is asked to lie down in a curled-up position, exposing the back. The physician then sterilizes the patient's back and numbs the skin around the insertion point. In other words, the physician or other medical professional does a "sterile prep and drape." The physician then inserts a spinal needle, with a stylet inside the spinal needle, between the patient's vertebrae (usually in the L3–4 or L4–5 interspace) and advances the needle until the needle has reached the fluid-filled area surrounding the patient's spine, the dural space. The stylet is used to prevent the tip of the spinal needle from becoming blocked by tissue as the needle is inserted through the patient's skin and other tissues. Once the needle is in place, the stylet is removed from the spinal needle and usually placed on the sterile tray. CSF flows through the needle and drips from the proximal end of the needle. The physician then takes four sterile tubes (three for pediatric patients) in turn from the tray and fills the tubes each with approximately 1 ml (or 1 cc) of CSF.

Usually, the physician must reach for a (closed or open) tube on the tray, collect an appropriate amount of CSF in the tube, seal the cap onto the tube (so that the fluid does not spill), reach over to the tray, lay the tube down on the tray, pick up another tube from the tray and repeat the process. If the physician is using a test tube rack, the physician must take an open tube from the test tube rack, collect an appropriate amount of CSF in the tube, replace the tube into the test tube rack on the tray, pick the next open tube from the test tube rack, and repeat the process. Currently, each test tube itself must be held beneath the proximal end of a spinal needle as the spinal fluid is collected. Space is tight between the physician and the patient with a spinal needle protruding from his/her back.

Once collected, CSF is then sent to a laboratory to determine if the patient is suffering from viral (for example, Enteroviruses and Herpes viruses, as well as Arboviruses, Rabies or measles among other viral agents), bacterial (including *Haemophilus influenza, Streptococcus pneumoniae, Neisseria meningitidis,* and also *Listeria monocytogenes, Staphylococcus epidermidis, Staphylococcus aureus, Mycobacterium tuberculosis, Escherichia Coli* or other Gram negative enteric bacteria) or fungal (including *Cryptococcus neoformans, Coccidioides immiitis*, among other fungal agents) infection of the brain or supporting structures, among other possible diagnoses. The CSF is also, examined for white and red blood counts and chemical components.

This procedure is very uncomfortable for the patient. The procedure is especially uncomfortable if the patient is very young or very sick, which is often the case. Reducing the duration of this procedure would reduce the duration of the patient's discomfort. This procedure also represents significant risk to the patient. Time is ticking while the physician puts the stylet down on the tray, reaches for a test tube, places the test tube in the proper position to collect CSF, fills the tube, screws the cap back on and reaches for the next tube. All the while, CSF is flowing from the patient. Patients may develop severe side effects from the loss of too much CSF, including severe headaches. The risk of the patient moving and causing injury exists for the duration of the procedure. These risks include a risk of lacerating a spinal nerve, lacerating the meninges (causing permanent or persistent leaks of CSF), or bleeding, which complicates the interpretation of laboratory results. These risks are increased in very young patients who are more likely to move during the procedure. In addition, there is a risk of respiratory arrest in neonates who are held in a curled-up position for the duration of the procedure. Reducing the duration of this procedure reduces these risks. In addition, these procedures are often performed in emergency rooms where physician time is at a premium. Minutes shaved from a procedure, performed several times over the course of a shift, may result in the physician being able to tend to additional patients.

Objects

It is a primary object and feature of the present invention to provide a cerebrospinal fluid collection system which allows a physician to better prepare for a spinal tap procedure, reduce the time necessary to carry out a spinal tap procedure, and reduce the risk of injury and severe side affects related to spinal tap procedures. It is a further object and feature of this invention to provide a test tube rack which is not too bulky, too difficult to hold, and/or too unwieldy to be used to hold test tubes while CSF is being collected. It is a further object and feature of the present invention to provide a test tube rack which is inexpensive to manufacture, disposable, sterilizable, see-through and lightweight. Other objects and features of this invention will be shown by the following descriptions and claims.

SUMMARY

According to a preferred embodiment of the present invention, this invention provides a spinal fluid collection system for use by a medical professional for collecting, from a spinal tap into a plurality of CSF tubes, multiple samples of cerebrospinal fluid from a patient, comprising, in combination: a plurality of CSF tubes structured and arranged to receive, seal, and transport cerebrospinal fluid; at least one spinal tap assembly structured and arranged to tap into the patient to obtain a flow of cerebrospinal fluid; and a holder structured and arranged to stably hold such CSF tubes when such holder is in an upright position; wherein such holder comprises a handle structured and arranged to assist single-hand manipulation of such holder by the medical professional during the collecting of the cerebrospinal fluid directly from such spinal tap into such CSF tubes, when held by such holder, in a continuing manner without the need to grasp any such CSF tube during the collecting. It also provides such a system further comprising a sealed internally-sterile package sealing such holder and such CSF tubes. And wherein such package further seals at least one such spinal tap assembly; and further, wherein such handle is structured and arranged to be grasped by either a right hand or a left hand of the medical professional.

Additionally, it provides such a system wherein such holder is structured and arranged to stably hold, when such holder is in an upright position, any element selected from the group consisting of a spinal needle, a spinal needle sleeve, a spinal needle stylet, a spinal needle sleeve holding a spinal needle, a spinal needle sleeve holding a spinal needle and a stylet.

It also provides such a system wherein such holder is structured and arranged to stably hold four of the CSF tubes when such holder is in an upright position; wherein such holder is structured and arranged to stably hold, when such holder is in an upright position, at a first portion of such holder any such element selected from such group; and wherein such holder is structured and arranged to stably hold, when such holder is in an upright position, at a second portion of such holder any such element selected from such group. And it further provides such a system wherein such holder further comprises four first vertical cavities each structured and arranged to support one of the CSF tubes; and at least two second vertical cavities each structured and arranged to support any such element selected from such group.

Moreover, it provides such a system wherein such holder comprises an essentially-transparent plastic material. It also provides such a system wherein such handle is structured and arranged to be grasped by either a right hand or a left hand of the medical professional. And it provides such a system wherein such first and second vertical cavities are arranged along a horizontal longitudinal row, having a midpoint, of such holder; and such handle is essentially horizontal and symmetrical with respect to such midpoint. And it further provides such a system wherein such handle comprises the furthest longitudinal horizontal extensions of such holder.

According to a preferred embodiment of the present invention, this invention also provides a spinal fluid collection system for use by a medical professional for collecting, from a spinal tap into a plurality of CSF tubes, multiple samples of cerebrospinal fluid from a patient, comprising: a holder structured and arranged to stably hold the CSF tubes when such holder is in an upright position; wherein such holder comprises a handle structured and arranged to assist single-hand manipulation of such holder by the medical professional during the collecting of the cerebrospinal fluid directly from the spinal tap into the CSF tubes, when held by such holder, in a continuing manner without the need to grasp directly any of the CSF tubes during the collecting; and wherein such holder is structured and arranged to stably hold, when such holder is in an upright position, any element selected from the group consisting of a spinal needle, a spinal needle sleeve, a spinal needle stylet, a spinal needle sleeve holding a spinal needle, a spinal needle sleeve holding a spinal needle and a stylet. Further, it provides such a system wherein such holder is structured and arranged to stably hold four of the CSF tubes when such holder is in an upright position; wherein such holder is structured and arranged to stably hold, when such holder is in an upright position, at a first portion of such holder any such element selected from such group; and wherein such holder is structured and arranged to stably hold, when such holder is in an upright position, at a second portion of such holder any such element selected from such group. And also, wherein such holder further comprises four first vertical cavities each structured and arranged to support one of the CSF tubes; and at least two second vertical cavities each structured and arranged to support any such element selected from such group.

Still further, it provides such a system wherein such holder comprises an essentially-transparent plastic material. And even further, it provides such a system wherein such handle is structured and arranged to be grasped by either a right hand or a left hand of the medical professional. Also, it provides such a system wherein such first and second vertical cavities are arranged along a horizontal longitudinal row, having a midpoint, of such holder; and such handle is essentially horizontal and symmetrical with respect to such midpoint. And it provides such a system wherein such handle comprises a horizontal plate comprising the furthest horizontal extensions of such holder in at least two directions; and wherein such handle comprises the furthest longitudinal horizontal extensions of such holder.

According to another preferred embodiment of the present invention, this invention also provides a spinal fluid collection system for use by a medical professional for collecting, from a spinal tap into a plurality of CSF tubes, multiple samples of cerebrospinal fluid from a patient, comprising the steps of: providing a CSF-tube holder having a handle and needle-holder to stably hold a spinal needle assembly; arranging at least three open CSF tubes in such holder; inserting a spinal needle containing a stylet between a patient's vertebrae until a tip of the spinal needle reaches a dural space; removing such stylet from such spinal needle; placing such stylet in such needle-holder of such holder; grasping such holder by such handle; placing such holder under the proximal end of such spinal needle so that CSF drips from such proximal end of such spinal needle into a first such open test tube; determining when such first open test tube contains a sufficient amount of CSF; shifting such holder so that CSF drips from such proximal end of such spinal needle into a second such open test tube; determining when such second open test tube contains a sufficient amount of CSF; shifting such holder so that CSF drips from such proximal end of such spinal needle into a third such open test tube; determining when such third open test tube contains a sufficient amount of CSF; removing such stylet from such needle-holder; replacing such stylet inside such spinal needle; removing such spinal needle containing such stylet from the dural space; placing such spinal needle containing such stylet into such needle-holder; and closing such three open test tubes.

Further it provides such a system further comprising the steps of: placing a needle sleeve into such needle-holder of such holder; and placing such spinal needle containing such stylet into such needle sleeve.

DETAILED DESCRIPTION OF THE PREFERRED EMBODIMENTS AND BEST MODES OF PRACTICE

Figure 1:
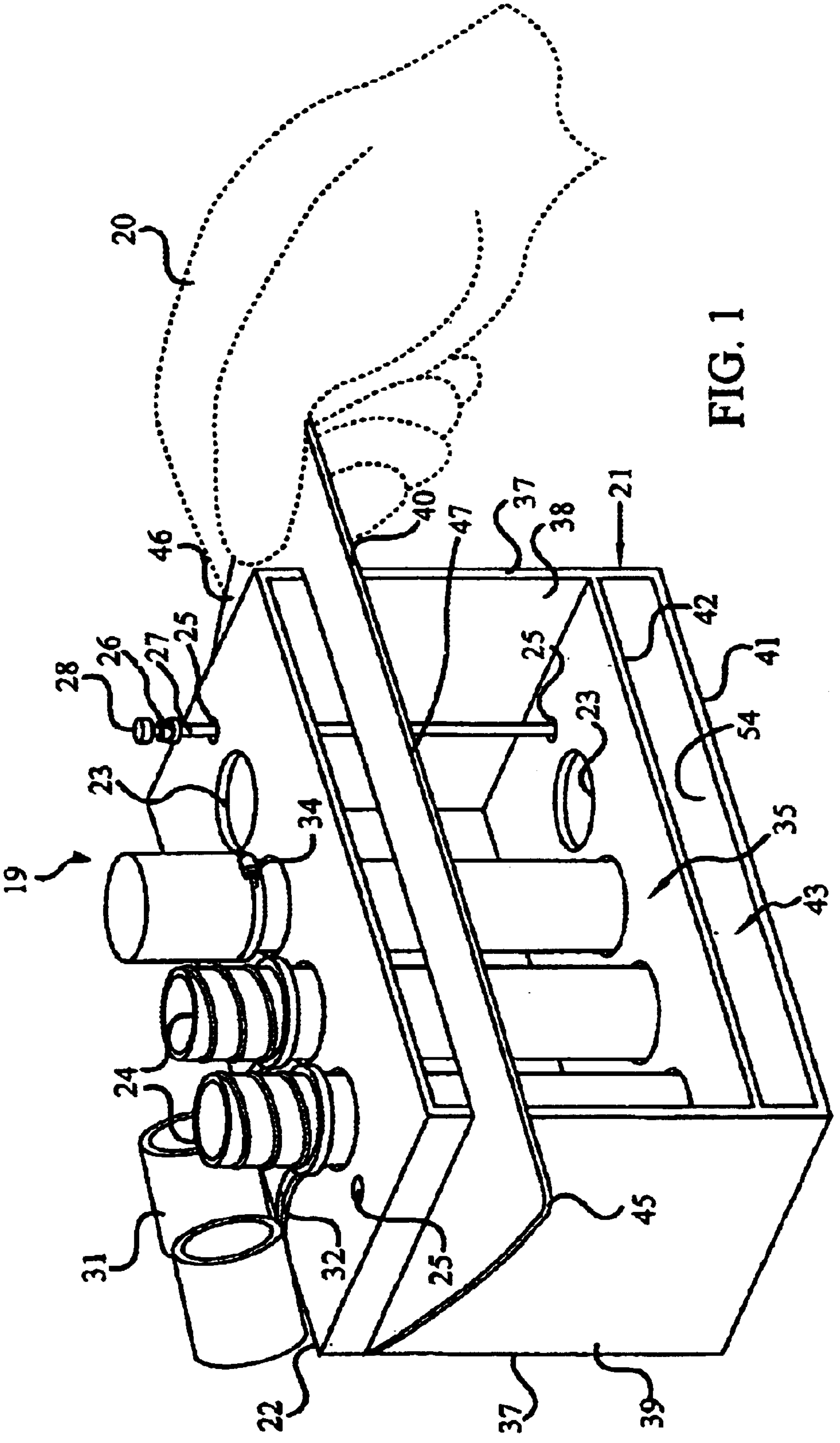
FIG. 1 is a perspective view of a preferred embodiment of the spinal fluid collection system of the present invention, and further illustrating a hand holding such system.

FIG. 1 is a perspective view of a preferred embodiment of the present invention illustrating a hand 20 holding the system 19, which embodies herein a spinal fluid collection system for use by a medical professional for collecting, from a spinal tap into a plurality of CSF tubes, multiple samples of cerebrospinal fluid from a patient. Illustrated in FIG. 1 is a preferred embodiment of the test tube rack 21, embodying herein a holder structured and arranged to stably hold such CSF tubes when such holder is in an upright position. The test tube rack 21 is preferably made of clear (i.e. see-through), lightweight, sterilizable, disposable, medical-grade plastic material. The test tube rack 21 has a top shelf 22, a handle shelf 40, a bottom shelf 41, an inside shelf 42, two side panels 37, and two open sides 35.

Top shelf 22 preferably has four test tube holes 23 arranged in a row across top shelf 22. These test tube holes 23 are preferably just slightly larger than the outside diameter of the test tubes 24 so that the test tubes 24 easily slide through the test tube holes 23 in top shelf 22 but also restrict the movement of the test tubes 24 within the test tube holes 23. The inside shelf 42 also preferably has four test tube holes 23, sized to contain test tubes 24, arranged in a row across inside shelf 42, and aligned directly below the four test tube holes 23 in top shelf 22. Preferably, each test tube 24 (embodying herein a plurality of CSF tubes structured and arranged to receive, seal, and transport cerebrospinal fluid) can slide through one of the four test tube holes 23 in the top shelf 22, slide through the corresponding test tube hole 23 in the inside shelf 42, and come to rest against bottom shelf 41 (which preferably does not have holes but which may have indentations if desired to assist stabilizing test tubes resting in the rack).

Also illustrated in FIG. 1 are needle holes 25, preferably arranged with one needle hole 25 at each end of the row of four test tube holes 23 in top shelf 22, this arrangement embodying herein a holder wherein such holder is structured and arranged to stably hold, when such holder is in an upright position, at a first portion of such holder any such element selected from such needle assembly group; and wherein such holder is structured and arranged to stably hold, when such holder is in an upright position, at a second portion of such holder any such element selected from such group. And this arrangement further embodies wherein such holder further comprises four first vertical cavities each structured and arranged to support one of the CSF tubes, and at least two second vertical cavities each structured and arranged to support any such element selected from such needle assembly group. Preferably, inside shelf 42 also has two needle holes 25 arranged directly underneath the needle holes in top shelf 22 so that a spinal needle 26, or a stylet 28, or a needle sleeve 27, or any combination of these, can preferably slide through the needle hole 25 in the top shelf 22, slide through corresponding needle hole 25 in the inside shelf 42, and come to rest against the bottom shelf 41.

Preferably, bottom shelf 41 has a slight indentation 44 (see FIG. 7) in its inside surface 54 (see also FIG. 7), aligned directly underneath the needle hole 25 in inside shelf 42 and top shelf 22 so that spinal needle 26 will be caught inside the slight indentation. Preferably, this slight indentation 44 will reduce the risk of the spinal needle 26, the needle sleeve 27 and/or the stylet 28 (this assembly embodying herein at least one spinal tap assembly structured and arranged to tap into the patient to obtain a flow of cerebrospinal fluid), placed through the needle holes 25 in top shelf 22 and inside shelf 42, sliding out of the test tube rack 21, even if the test tube rack 21 is tilted at an angle. In addition, these two (preferably identical) needle holes 25 are arranged at both ends of the test tube holes 23 so that a physician using the test tube rack 21 might be comfortable using the test tube rack left-handed or right-handed. Preferably, the spinal needle 26 is an 22 G 3½ (1.27 mm×8.89 cm Leur-Lok (™) hub) spinalineedle with a Quincke-type point, available through Becton-Dickinson, Franklin Lakes N.J. 07417, reorder No. 405184.

With further reference to FIG. 1, the test tubes 24 typically have screw-on caps 31. These screw-on caps 31 are connected to the test tubes 24 by flexible plastic tabs 32. The flexible plastic tabs 32 are attached to the test tubes 24 by rings 34 around the test tubes 24. The test tubes 24 are preferably made of sterilizable, lightweight, plastic material. Test tubes 24 have markings 48 (see FIG. 3) illustrating one milliliter (ml) or one cubic centimeter (cc) increments (up to 8 cc or 8 ml) so that the physician collecting CSF can tell when 1 cc of fluid has been collected. The bottom ends of test tubes 24 have inverted cone-shaped (tip down) internal surfaces so that the test tubes 24 can be spun in a centrifuge, allowing solid materials to settle in the bottom of the tubes. Such test tubes 24 are preferably approximately 4½ inches long, approximately ⅝ inch in outside diameter, standard CSF tubes. These test tubes 24 are well known in the art and readily available from well-known sources.

Top shelf 22 is attached at each end to side panels 37. Side panels 37 are preferably made of the same lightweight, clear (i.e. see-through) plastic used to make top shelf 22 and the rest of the structure of the test tube rack 21, thus embodying herein that such holder comprises an essentially-transparent plastic material. Side panels 37 have internal surfaces 38 and external surfaces 39. Preferably, integrally attached to the external surface 39 of side panels 37 is a handle shelf 40. Preferably, handle shelf 40 wraps around one of the open sides 35, making that open side the front 43 of the test tube rack 21.

Alternatively, handle shelf 40 may preferably extend through the test tube rack 21, contain four test tube holes in a row and two needle holes, aligned between top shelf 22 with its four test tube holes 23 and two needle holes 25 and inside shelf 42, with its four test tube holes 23 and two needle holes 25, so that test tubes 24 can pass through top shelf 22, handle shelf 40 and inside shelf 42 before coming to rest against bottom shelf 41. Handle shelf 40 is preferably shaped as shown so that a physician can hold the test tube rack 21 with a left hand on the left side 45 of the handle shelf 40 (left hand not shown), with a right hand 20, on the right side 46 of handle shelf 40, or with either hand from the front 47 of the handle shelf 40 (such shelf embodying herein a handle structured and arranged to assist single-hand manipulation of such holder by the medical professional during the collecting of the cerebrospinal fluid directly from such spinal tap into such CSF tubes, when held by such holder, in a continuing manner without the need to grasp any such CSF tube during the collecting). This handle arrangement also embodies a handle arrangement wherein such first and second vertical cavities are arranged along a horizontal longitudinal row, having a midpoint, of such holder, and such handle is essentially horizontal and symmetrical with respect to such midpoint, and wherein such handle comprises the furthest longitudinal horizontal extensions of such holder.

Top shelf 22, inside shelf 42 and bottom shelf 41 are integrally attached to the internal surfaces 38 of side panels 37. Preferably, the whole test tube rack 21, including top shelf 22, side panels 37, handle shelf 40, inside shelf 42 and bottom shelf 41 are all made in the same mold of the same see-through lightweight, sterilizable, disposable, medical grade plastic material. Less preferably, the test tube rack 21, including top shelf 22, side panels 37, inside shelf 42 and bottom shelf 41 are all made in the same mold of the same see-through plastic material, with the handle shelf 40 being poured separately, in a separate mold, but using the same material. Preferably, handle shelf 40, molded separately, can be attached to the rest of the test tube rack 21 by heat welding, gluing or other appropriate attachment method. Less preferably, any subset of the test tube rack 21, such as the top shelf 22 and the handle shelf 40, attached by side panels 37, may be molded separately from any remaining subset of the test tube rack 21 (such as the inside shelf 42 and the bottom shelf 41), attached by side panels 37, and later connected together by heat welding, gluing or other attachment method. Separate molding of subsets of parts of the test tube rack 21, although less preferable, may be necessary in such circumstances which, for example, make the molding and manufacturing process easier and less expensive.

Figure 2:
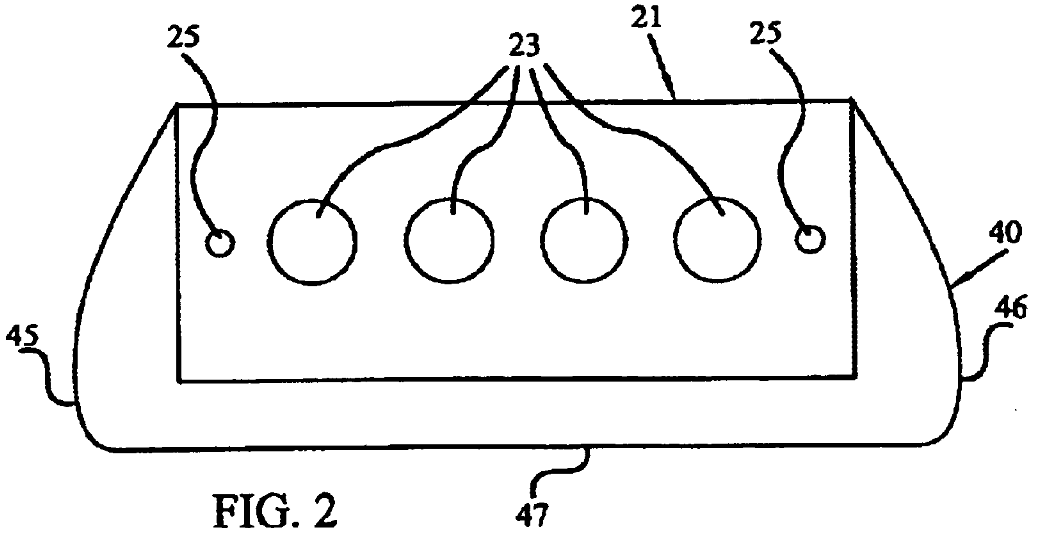
FIG. 2 is a top view of the test tube rack of the preferred embodiment of FIG. 1.

FIG. 2 is a top view of the preferred embodiment of test tube rack 21. FIG. 2 illustrates the four test tube holes 23, arranged in a row, sized to hold test tubes 24, and also illustrates the two needle holes 25 sized to hold a spinal needle 26, a needle sleeve 27 or a stylet 28 (see FIG. 1). FIG. 2 also shows a preferred size and shape of handle shelf 40. Preferably handle shelf 40 is large enough so that a hand 20 (see FIG. 1), can hold the test tube rack 21 on the left side 45 of handle shelf 40, on the right side 46 of handle shelf 40, or on the front 47 of handle shelf 40. The shape illustrated in FIG. 2 is preferable for the handle shelf 40. Other shapes, including separate left and right wing handles, or a separate front handle, a square-shaped handle shelf, or more rounded shapes, may all be preferred under specific circumstances of cost, manufacture, use, etc.

Figure 3:
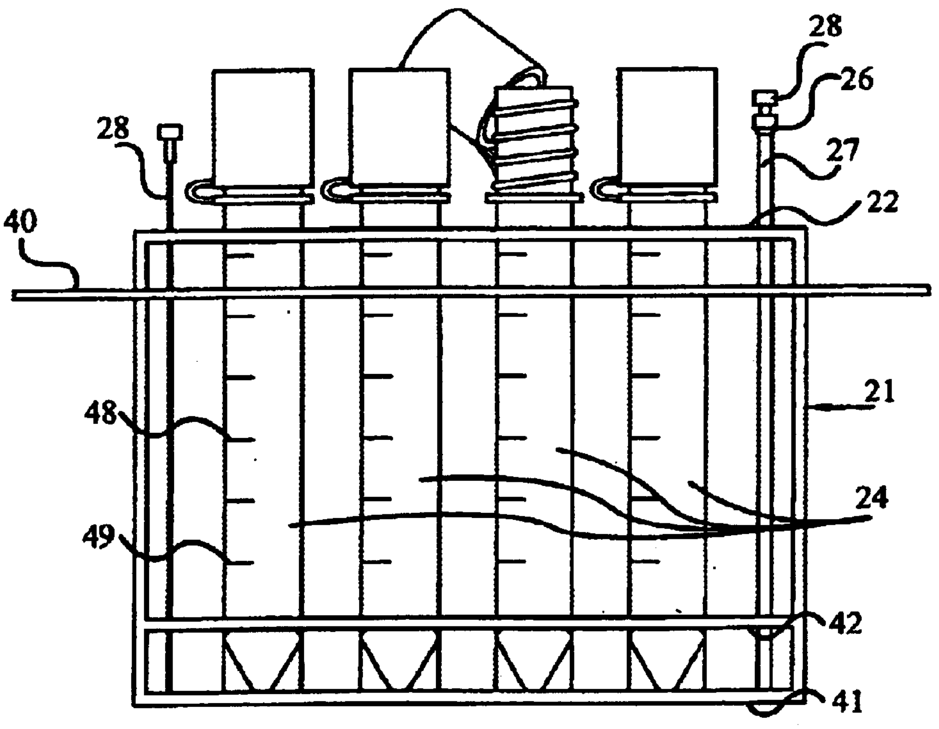
FIG. 3 is a front view of the preferred embodiment of FIG. 1, but illustrating the test tube rack holding four tubes, a needle in its needle sleeve and a stylet.

FIG. 3 illustrates the test tube rack 21 containing a stylet 28 by itself, four test tubes 24, and a spinal needle 26 containing a stylet 28 encased in its needle sleeve 27, each passing through holes in top shelf 22 and inside shelf 42 (See FIG. 1), and resting against bottom shelf 41 (these descriptions embodying herein wherein such holder is structured and arranged to stably hold, when such holder is in an upright position, any element selected from the group consisting of a spinal needle, a spinal needle sleeve, a spinal needle stylet, a spinal needle sleeve holding a spinal needle, and a spinal needle sleeve holding a spinal needle and a stylet). Inside shelf 42 is preferably arranged so that, when held in test tube rack 21 in this manner, the 1 cc marking 49 on the test tubes 24 can readily be seen by a person holding the test tube rack 21. In other words, it is preferable that the physician can see when the test tubes 24 are filled with 1 cc (or 1 ml) of fluid when the test tubes 24 are contained in the test tube rack 21.

Figure 4:
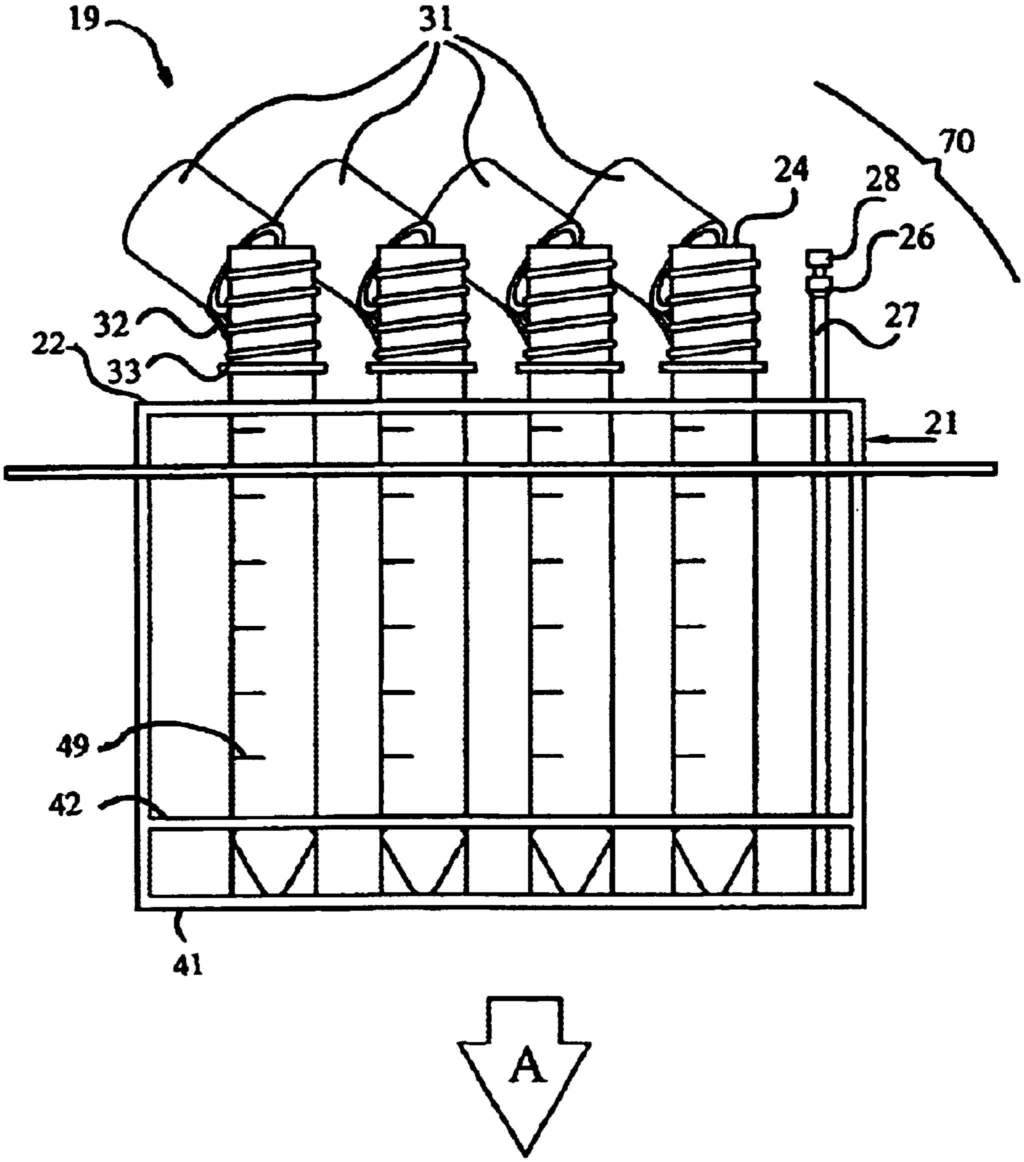
FIG. 4 is a partial front view of the preferred spinal fluid collection system, illustrating the first step in the method of using such system, assembling the equipment.

FIG. 4 illustrates the first step—assembling the equipment—in the method of using the test tube rack 21 and system 19 of the present invention. The spinal needle 26 containing a stylet 28, encased in a needle sleeve 27, can preferably be removed from its sterile packaging and placed through its corresponding needle hole 25 (see FIG. 1) in the test tube rack 21. The four test tubes 24 can preferably be removed from their sterile packaging, their lids 31 can be unscrewed, and they can be placed in their corresponding holes 23 (see FIG. 1). As an alternate preferred embodiment, the four test tubes 24 can be placed in the test tube rack 21 and then sterilized along with the test tube rack 21 and packaged together in one sterile packet. In other words, it is preferable that the test tube rack 21 containing the four test tubes 24, with their screw-on caps 31 unscrewed (but attached to the test tubes by the plastic rings 33 and plastic tabs 32 described above) be sterilized and packaged together in a single package. In that way, all the physician or other medical professional has to do to prepare for a spinal tap procedure is pull two sterile packages open (one for the needle, stylet and sleeve and one for the tubes and rack) and place the test tube rack 21 containing the open tubes 24 on the procedure tray. Alternately, the test tube rack 21 may preferably be placed in a sterile package alone.

As another alternate preferred embodiment, the test tubes 24, the test tube rack 21 and the spinal needle 26 (along with the stylet 28 and the needle sleeve 27) can be prepackaged and sterilized together—i.e., the elements of system 19 in the condition shown and as illustrated in FIG. 4—so that the physician only has to open one package 70 to have all of these items ready to perform a spinal tap procedure. Prepackaging some or all of these necessary tools together, using this test tube rack 21, decreases the amount of time necessary for the physician or other medical professional to spend setting up for a spinal tap procedure. These described prepackages embody herein a sealed internally-sterile package sealing such holder and such CSF tubes and further wherein such package, further seals at least one such spinal tap assembly.

Figure 5:
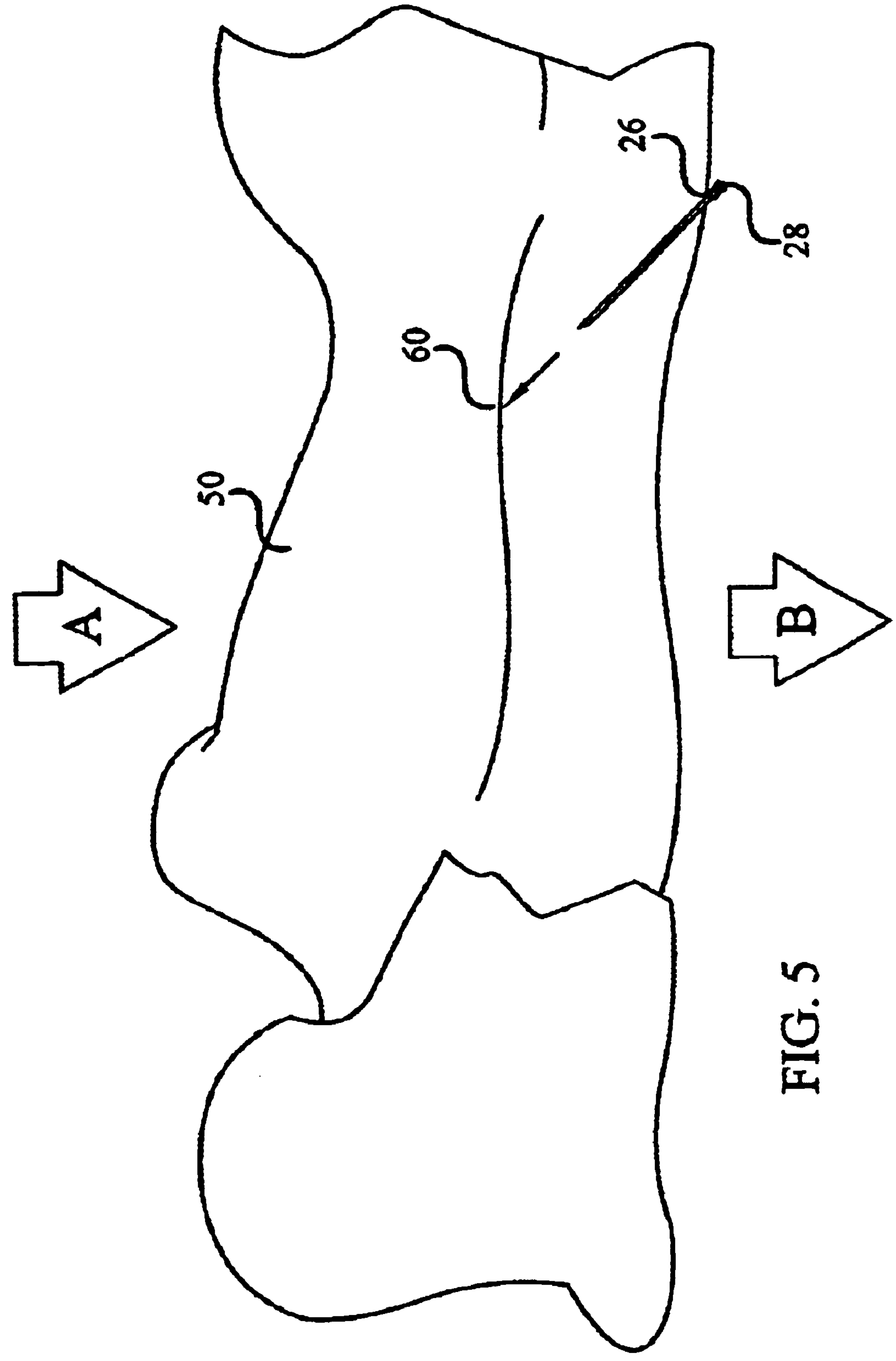
FIG. 5 is a pictorial view illustrating a subsequent step, inserting the spinal needle into a back.

FIG. 5 illustrates a subsequent step in the method of using a preferred embodiment of the present invention. Once the physician or other medical professional has assembled all of the equipment that will be necessary to perform the procedure, including the four test tubes 24 (see FIG. 4) and the spinal needle 26 with its stylet 28 is inserted through the spinal needle 26, then the patient must be prepared. Typically, the patient is placed on his or her side, exposing his/her back 50. The patient's back 50 is sterilized and the skin around the site 60 of insertion is numbed. In other words, the patient is "draped and prepped." Preferably, the spinal needle 26 (with the stylet 28 inserted through the spinal needle 26) is inserted at site 60 between the patient's vertebrae, illustrated in FIG. 5 and discussed above.

Figure 6:
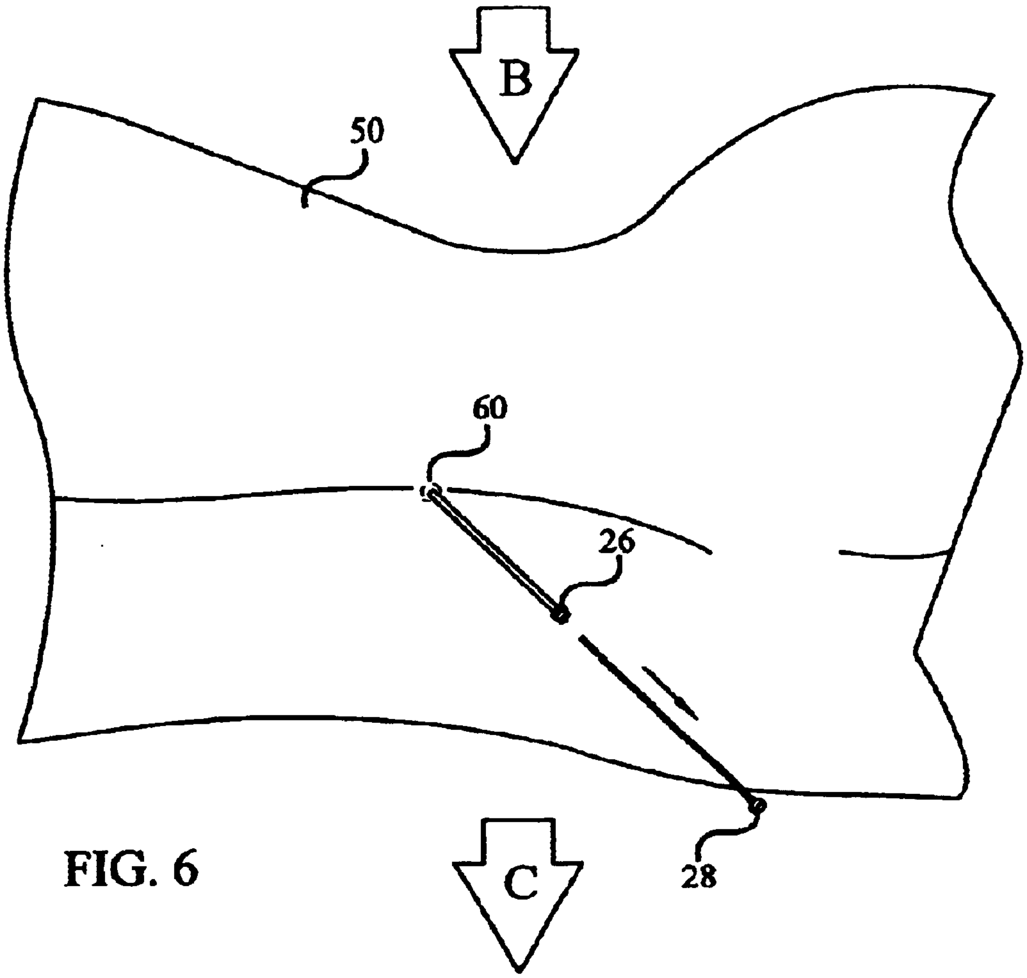
FIG. 6 is a partial close-up view illustrating a subsequent step, removing the stylet from the needle.

FIG. 6 illustrates that, once the spinal needle 26 is inserted into the patient's back 50 and positioned correctly, the stylet 28 is preferably removed from the spinal needle 26. Less typically, the spinal needle 26 may be inserted into the dural space without the stylet 28. Some practitioners prefer not to use the stylet 28 at all. In that case, the preferable method described herein is modified only in that the stylet 28 is, discarded when the sterile packaging containing the spinal needle 26 is opened.

Figure 7:
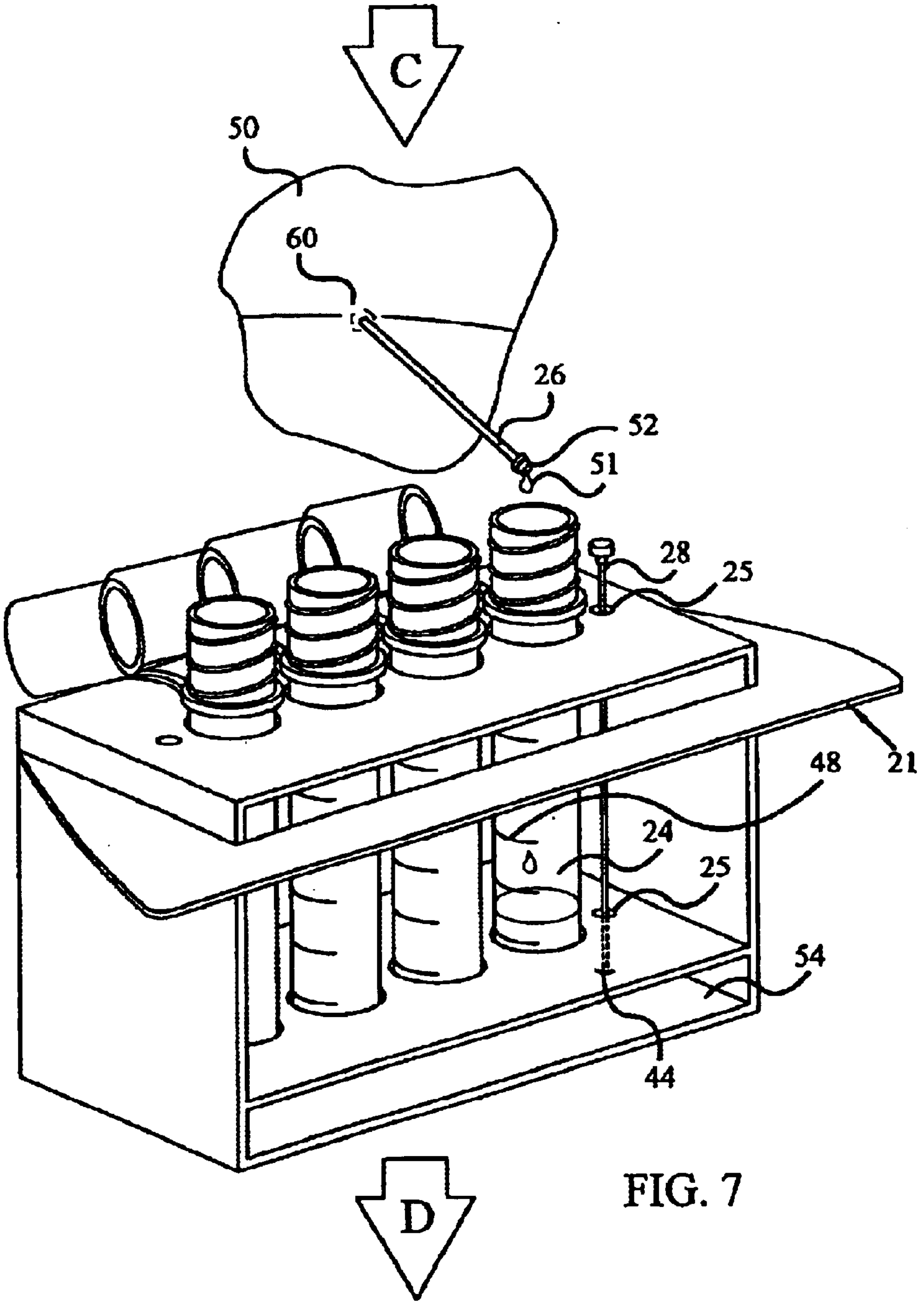
FIG. 7 is a partial perspective view illustrating a subsequent step, collecting CSF into a tube held in the test tube rack.

FIG. 7 illustrates subsequent steps in the method of using the preferred embodiment of the present invention, showing the collecting of CSF 51 into a test tube 24 held in the test tube rack 21. Once the spinal needle 26 is inserted into a back 50, and the stylet 28 is removed from the spinal needle 26, as illustrated in FIG. 6, the stylet 28 can be placed (as shown in FIG. 7) into the test tube rack 21, through a needle hole 25. Once the stylet 28 is removed from the spinal needle 26, CSF 51 flows through the spinal needle and drips from the proximal end 52 of the spinal needle 26. The whole test tube rack 21 containing four open test tubes 24 (or three for a pediatric procedure) can preferably be conveniently placed (as by the physician's hand 20, see FIG. 1) under the proximal end 52 of the spinal needle 26 to collect CSF 51. When a sufficient amount of CSF 51 has been collected, as indicated by the markings 48 on the test tube 24, the physician preferably simply moves the entire test tube rack 21, so that the next unfilled test tube 24 is aligned under the proximal end 52 of the spinal needle 26, inserted into the patient's back 50. FIG. 7 also illustrates the preferable slight indentation 44 in the inside surface 54 of the bottom shelf 41 of the test tube rack 21 to assist in preventing the spinal needle 26, or needle sleeve 27, or stylet 28 from moving.

Figure 8:
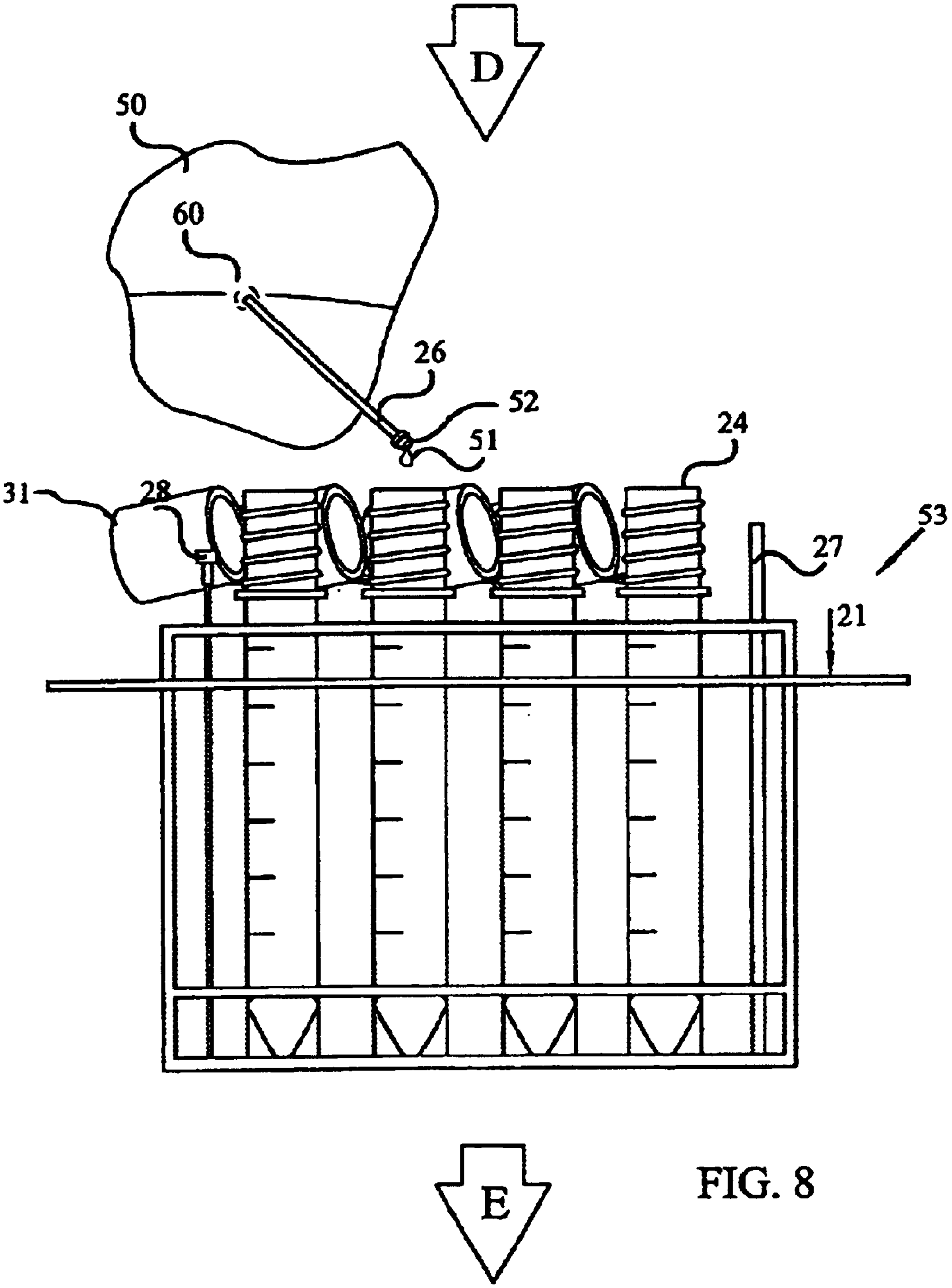
FIG. 8 is a partial front view illustrating an additional step, collecting CSF into another tube held in the test tube rack.

FIG. 8 illustrates another step in the method of using the preferred embodiment of the present invention, filling another test tube 24 with CSF 51. FIG. 8 illustrates the test tube rack 21 containing four test tubes 24, the stylet 28 and the needle sleeve 27. This assembly 53 (the test tube rack 21 containing four test tubes 24, the stylet 28, and the needle sleeve 27) is the preferable assembly 53 during collection of CSF 51. The assembly 53 is preferably simply shifted a few centimeters in one direction or the other (depending on the handedness and preferences of the practitioner) so that the next test tube 24 is aligned underneath the proximal end 52 of the spinal needle 26 to collect CSF 51.

Figure 9:
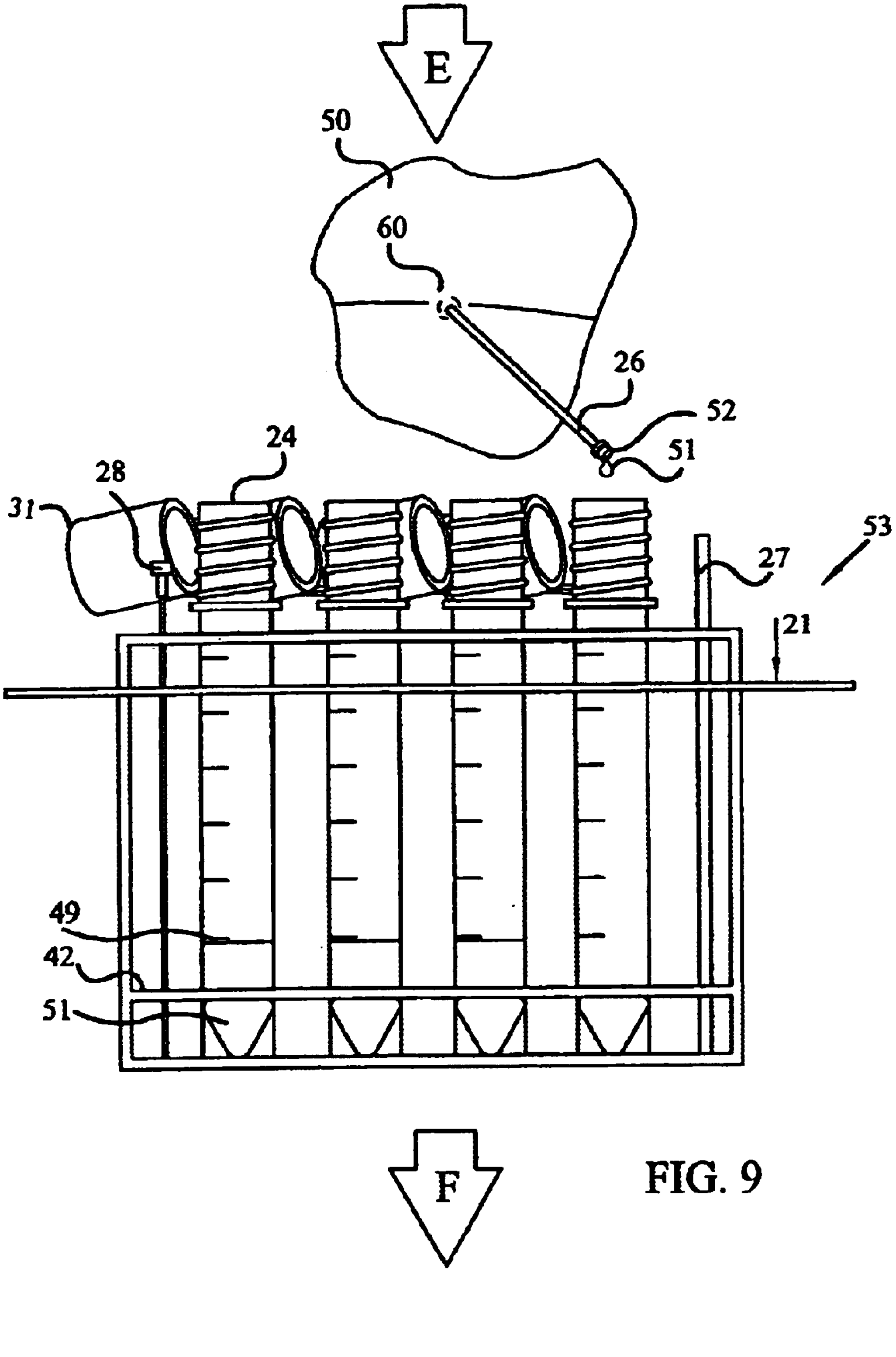
FIG. 9 is a front view illustrating an additional step, collecting CSF into a final tube held in the test tube rack.

FIG. 9 illustrates an additional step in the method of using the preferred embodiment of the present invention, filling the final test tube 24 with CSF 51. Again, the assembly 53 is preferably simply shifted a few centimeters in one direction or the other (depending on the handedness and preferences of the practitioner) so that the final test tube 24 is aligned underneath the proximal end 52 of the spinal needle 26 to collect CSF 51. FIG. 9 also illustrates that the inside shelf 42 of the test tube rack 21 is preferably aligned so that the 1 cc markings 49 on the test tubes 24 are clearly visible when the test tubes 24 are contained in the test tube rack 21.

Figure 10:
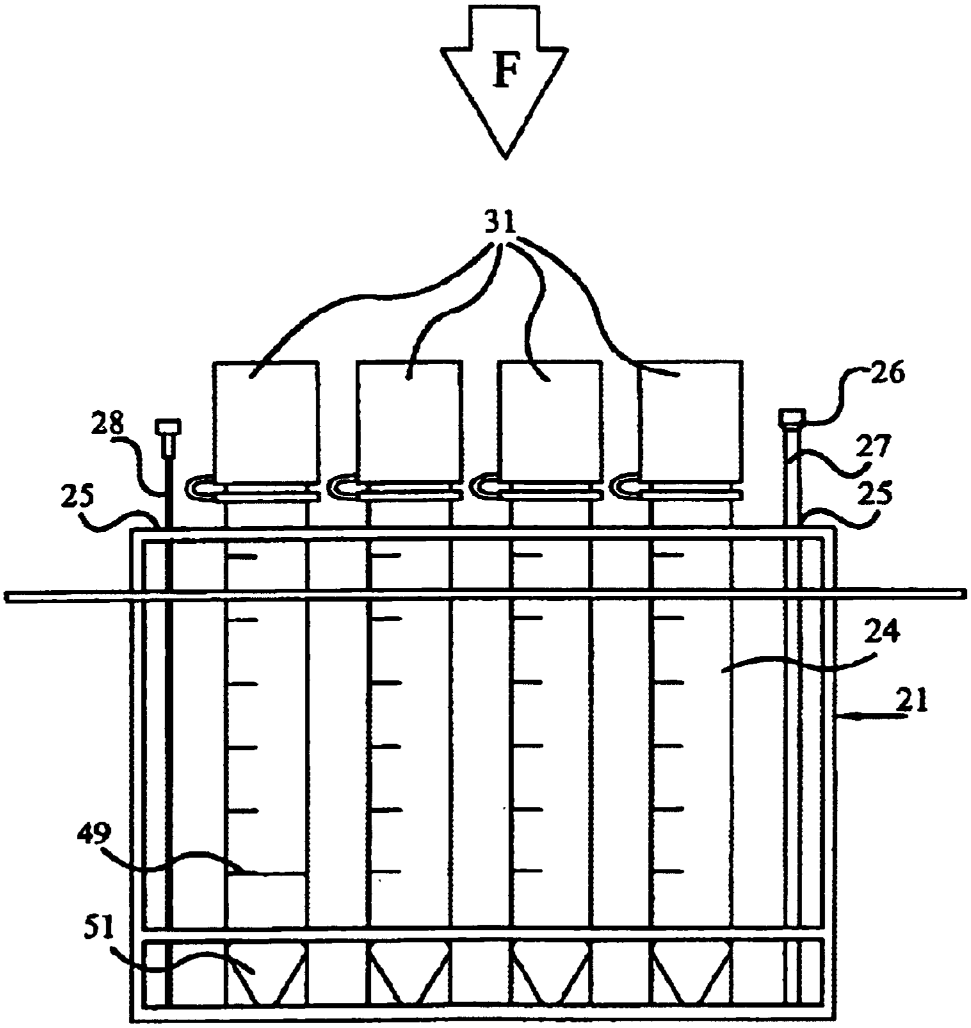
FIG. 10 is a front view illustrating an additional step, closing the tubes and replacing the needle into the rack.

FIG. 10 illustrates a subsequent step in the method of using the preferred embodiment of the present invention, closing the screw-on caps 31 on the test tubes 24. Once an appropriate amount of CSF 51 has been collected in each test tube 24, the stylet 28 is preferably re-inserted into the spinal needle 26 before the spinal needle 26 is removed from the patient's back 50. It is preferable to re-insert the stylet 28 through the spinal needle 26 before removing the spinal needle 26 because it may assist in preventing leakage of CSF 51 after the spinal needle 26 is removed. Once removed from the patient's back 50, the spinal needle 26, containing the stylet 28, may preferably be placed in the test tube rack 21, through a needle hole 25. Or, alternatively, if the stylet is not re-inserted through the spinal needle 26 before the spinal needle 26 is removed from the patient's back 50, the stylet 28 may remain in place in the test tube rack 21 as shown in FIG. 10, and the spinal needle 26 may be placed into the needle sleeve 27 which is already inserted through a needle hole 25. When the spinal needle 26 is replaced into the test tube rack 21 in either of these preferred ways, the danger of needle sticks is reduced. By replacing the spinal needle 26 in this way, the needle is placed in a predictable position, needle tip down, so that the physician or other medical professional who cleans up after the procedure is not faced with picking up a loose contaminated needle oh a tray. Or, if the needle is placed back through the needle sleeve 27, the physician or other medical professional avoids the potentially dangerous activity of trying to slide a needle, which has had contact with bodily fluids of a patient, into a needle sleeve 27. Once the spinal needle 26 is removed from the patient and placed into the test tube rack 21, the screw-on caps 31 of the test tubes 24 can preferably simply be screwed down onto the test tubes 24, creating a seal to prevent leakage or spillage of CSF 51 from the test tubes 24 as they are transported to a laboratory for analysis.

This described method embodies herein a method comprising the steps of: providing a CSF-tube holder having a handle and needle-holder to stably hold a spinal needle assembly; arranging at least three open CSF tubes in such holder; inserting a spinal needle containing a stylet between a patient's vertebrae until a tip of the spinal needle reaches a dural space; removing such stylet from such spinal needle; placing such stylet in such heedle-holder of such holder; grasping such holder by such handle; placing such holder under the proximal end of such spinal needle so that CSF drips from such proximal end of such spinal needle into a first such open test tube; determining when such first open test tube contains a sufficient amount of CSF; shifting such holder so that CSF drips from such proximal end of such spinal needle into a second such open test tube; determining when such second open test tube contains a sufficient amount of CSF; shifting such holder so that CSF drips from such proximal end of such spinal needle into a third such open test tube; determining when such third open test tube contains a sufficient amount of CSF; removing such stylet from such needle-holder; replacing such stylet inside such spinal needle; removing such spinal needle containing such stylet from the dural space; placing such spinal needle containing such stylet into such needle-holder; and closing such three open test tubes; and further comprising the steps of placing a needle sleeve into such needle-holder of such holder, and placing such spinal needle containing such stylet into such needle sleeve.

Although applicant has described applicant's preferred embodiments of this invention, it will be understood that the broadest scope of this invention includes such modifications as diverse shapes and sizes, materials and methods of manufacture. Such scope is limited only by the below claims as read in connection with the above specification. Further, many other advantages of applicant's invention will be apparent to those skilled in the art from the above descriptions and the below claims.

What is claimed is:

1. A spinal fluid collection system for use by a medical professional for collecting, from a spinal tap into a plurality of CSF tubes, multiple samples of cerebrospinal fluid from a patient, comprising, in combination, a) a plurality of CSF tubes structured and arranged to receive, seal, and transport cerebrospinal fluid;

b) at least one spinal tap assembly structured and arranged to tap into the patient to obtain a flow of cerebrospinal fluid; and c) a holder structured and arranged to stably hold said CSF tubes when said holder is in an upright position;

d) wherein said holder comprises a handle structured and arranged to assist single-hand manipulation of said holder by the medical professional during the collecting of the cerebrospinal fluid directly from said spinal tap into said CSF tubes, when held by said holder, in a continuing manner without the need to grasp any said CSF tube during the collecting; and e) wherein when said holder is structured and arranged to stably hold when said holder is in an upright position, an element selected from the group consisting of:

a. a spinal needle;

b. a spinal needle sleeve;

c. a spinal needle stylet;

d. a spinal needle sleeve holding a spinal needle;

e. a spinal needle sleeve holding a spinal needle and a stylet;

f) wherein said holder is structured and arranged to stably hold four of the CSF tubes when said holder is in an upright position;

g) wherein said holder is structured and arranged to stably hold, when said holder is in an upright position, at a first portion of said holder an element selected from such group;

h) wherein said holder is structured and arranged to stably hold, when said holder is in an upright position, at a second portion of said holder an element selected from such group.

2. The spinal fluid collection system according to claim 1 wherein said holder further comprises:

a) four first vertical cavities each structured and arranged to support one of the CSF tubes; and b) at least two second vertical cavities each-structured and arranged to support any such element selected from such group.

3. The spinal fluid collection system according to claim 2 wherein:

a) said first and second vertical cavities are arranged along a horizontal longitudinal row, having a midpoint, of said holder; and b) said handle is essentially horizontal and symmetrical with respect to such midpoint.

4. The spinal fluid collection system according to claim 3 wherein said handle comprises the furthest longitudinal horizontal extensions of said holder.

5. A method of using a spinal fluid collection system comprising the steps of:

a) providing an open-sided spinal fluid collection test tube rack comprising a plurality of test tube holders and two needle holders;

b) arranging at least three open test tubes in a test tube holder of the test tube rack;

c) placing a needle sleeve into a first needle holder;

d) inserting a spinal needle containing a stylet between a patient's vertebrae until a tip of the spinal needle reaches a dural space;

e) removing the stylet from the needle;

f) placing the stylet in a second needle holder;

g) holding said test tube rack containing the at least three open test tubes under a proximal end of the needle to catch CSF;

h) determining when an open test tube contains a sufficient amount of CSF;

i) shifting the open-sided spinal fluid collection test tube rack so that CSF drips from the proximal end of the needle into a second open test tube;

j) determining when the second open test tube contains a sufficient amount of CSF;

k) shifting the open-sided spinal fluid collection test tube rack so that CSF drips from the proximal end of the needle into a second open test tube;

l) determining when the second open test tube contains a sufficient amount of CSF;

m) removing the stylet from the needle holder;

n) replacing the stylet inside the needle;

o) removing the needle from the dural space;

p) placing the spinal needle containing the stylet into the needle holder; and q) closing the at least three open test tubes.

* * * * *